United States Patent
Schindler et al.

(10) Patent No.: US 6,205,318 B1
(45) Date of Patent: Mar. 20, 2001

(54) POWER MANAGEMENT CONTROLLER FOR COMPUTER SYSTEM

(75) Inventors: Jeffrey Schindler, Sioux City, IA (US); William J. Pytlovany, Scotia, NY (US)

(73) Assignee: Gateway 2000, Inc., North Sioux City, SD (US)

( * ) Notice: Subject to any disclaimer, the term of this patent is extended or adjusted under 35 U.S.C. 154(b) by 0 days.

(21) Appl. No.: 08/835,187

(22) Filed: Apr. 7, 1997

(51) Int. Cl.[7] ............ H04H 7/00; G09G 5/00; H04N 5/63; H04N 5/44
(52) U.S. Cl. ............ 455/6.3; 345/212; 348/730; 348/734
(58) Field of Search ............ 455/6.3; 348/730, 348/734; 345/158, 169, 117, 211, 212

(56) References Cited

U.S. PATENT DOCUMENTS

| | | | |
|---|---|---|---|
| 4,259,668 | * | 3/1981 | Nishimura ............ 345/169 |
| 4,746,919 | * | 5/1988 | Reitmeir ............ 340/825.56 |
| 5,033,085 | * | 7/1991 | Rew ............ 380/20 |
| 5,339,095 | * | 8/1994 | Redford ............ 345/158 |
| 5,375,245 | * | 12/1994 | Solhjell et al. ............ 345/212 |
| 5,389,952 | * | 2/1995 | Kikinis ............ 345/212 |
| 5,408,275 | * | 4/1995 | Song et al. ............ 348/734 |
| 5,513,359 | * | 4/1996 | Clark et al. ............ 345/212 |
| 5,576,738 | * | 11/1996 | Anwyl ............ 345/212 |
| 5,598,565 | * | 1/1997 | Reinhardt ............ 345/90 |
| 5,675,364 | * | 10/1997 | Stedman ............ 345/211 |
| 5,696,978 | * | 12/1997 | Nishikawa ............ 345/212 |
| 5,784,060 | * | 7/1998 | Bertram et al. ............ 345/354 |
| 5,822,599 | * | 10/1998 | Kidder ............ 345/212 |
| 5,886,689 | * | 3/1999 | Chee ............ 345/212 |

* cited by examiner

Primary Examiner—John W. Miller
(74) Attorney, Agent, or Firm—Schwegman, Lundberg, Woessner & Kluth, P.A.; Joseph H. Lee

(57) ABSTRACT

An entertainment system has a personal computer as the heart of the system with a large screen VGA quality monitor as the display of choice. The system has digital satellite broadcast reception, decompression and display capability with multiple radio frequency remote control devices which transmit self identifying signals and have power adjustment capabilities. These capabilities are used to provide context sensitive groups of keys which may be defined to affect only selected applications running in a windowing environment. In addition, the remote control devices combine television and VCR controls with standard personal computer keyboard controls. An applet running on the personal computer receives power commands from the remote control devices and issues power mode commands to video and audio cards to emulate on/off functions of standard televisions. A keyboard remote also integrates a touchpad which is food contamination resistant and may also be used for user verification. Included in the system is the ability to recognize verbal communications in video signals and maintain a database of such text which is searchable to help identify desired programming in real time.

20 Claims, 5 Drawing Sheets

POWER MANAGEMENT CONTROLLER FOR COMPUTER SYSTEM

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The present invention relates to computer systems, and in particular to a method and apparatus for controlling the power modes of selected components of the computer system.

BACKGROUND OF THE INVENTION

The consumer electronics industry has created many stand alone products for specific functions, such as television viewing, video recording and playback, broadband video receivers, playing recorded music and broadcast music. Much of this function is being provided by computer systems. However, computer systems were initially designed to run complex computer programming. When these systems were turned on, it took significant amounts of time to load in required programming and test the system. In addition, when the systems were turned off, they required time to ensure that all data was properly stored, and the system was shut down in an orderly fashion. These long times to turn on and shut down computer systems were very different from the instant on and off features found in a television set.

Computer systems today have very advanced forms of power management available. Many portable systems have various power modes designed to conserve batteries. After predetermined periods of non-use, they enter these modes, shutting down predetermined components, such as disk drive devices and displays. Further, personal computer systems which do not use batteries often have screen savers, and display power management that places the display in a standby mode. In standby modes, the display is essentially shut down. This is usually accomplished by high level programming, such as advanced power management APM functions in Windows 95 by Microsoft which defines commands to use in placing multiple devices into different power management modes. In a further prior art system, a screen saver has a hot corner, which when selected, puts the display in standby mode.

There is a need for personal computers which play video and audio signals to operate more like a television set to meet the expectations of user which are comfortable with the mode of operation of televisions and other common consumer devices. There is a need for a personal computer to provide power management functions which bridge the gap between older computer systems, and their long waiting times on power up and down, and the instant on/off features of television sets.

SUMMARY OF THE INVENTION

A computer system which is capable of playing video and audio signals is provided with a user input device which also contains a power management selector. Selection of the power management selector causes an input driver to initiate sending of desired power management commands to selected devices. The devices comprise a video card driving a display and a sound card. The video card places the display in a standby mode, and the sound card mutes its output, or the video card turns on the display and the sound card turns off mute very quickly to simulate instant on/off features of common television sets.

In one embodiment, the input device comprises a remote control device such as a keyboard, or a hand held remote control device. The power management selector comprises a single power key or combination of keys. One such combination comprises WIN+ALT+PrintScreen. The power key is encoded and transmitted as RF signals and is received by a corresponding RF receiver in the computer system. A keyboard driver receives the encoded information and passes it to an applet which generates a command for a video driver to toggle the monitor between a standby power state and an on power mode if already in standby mode. Thus, it appears to an average user as a power on/off key. In addition, the keyboard driver generates a mute command for the sound card, which also toggles between a mute on, or standby mode and a mute off, or normal mode, appearing again to be on or off. This function is provided with very little delay, as advanced power management functions of higher level software are bypassed. It closely tracks the times that a common television might require. The selected devices can also comprise devices other than those processing sound and audio, such as modems and secondary storage devices which need not be operating if a user is not interacting with the computer system. It results in a further reduction in power consumed. In further embodiments, upper level software is utilized to issue the power management commands to the selected devices.

DESCRIPTION OF THE EMBODIMENTS

In the following detailed description of the preferred embodiment, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims. Signals and connections may be referred to by the same number or label, and the actual meaning should be clear from the context of use.

Figure 1:
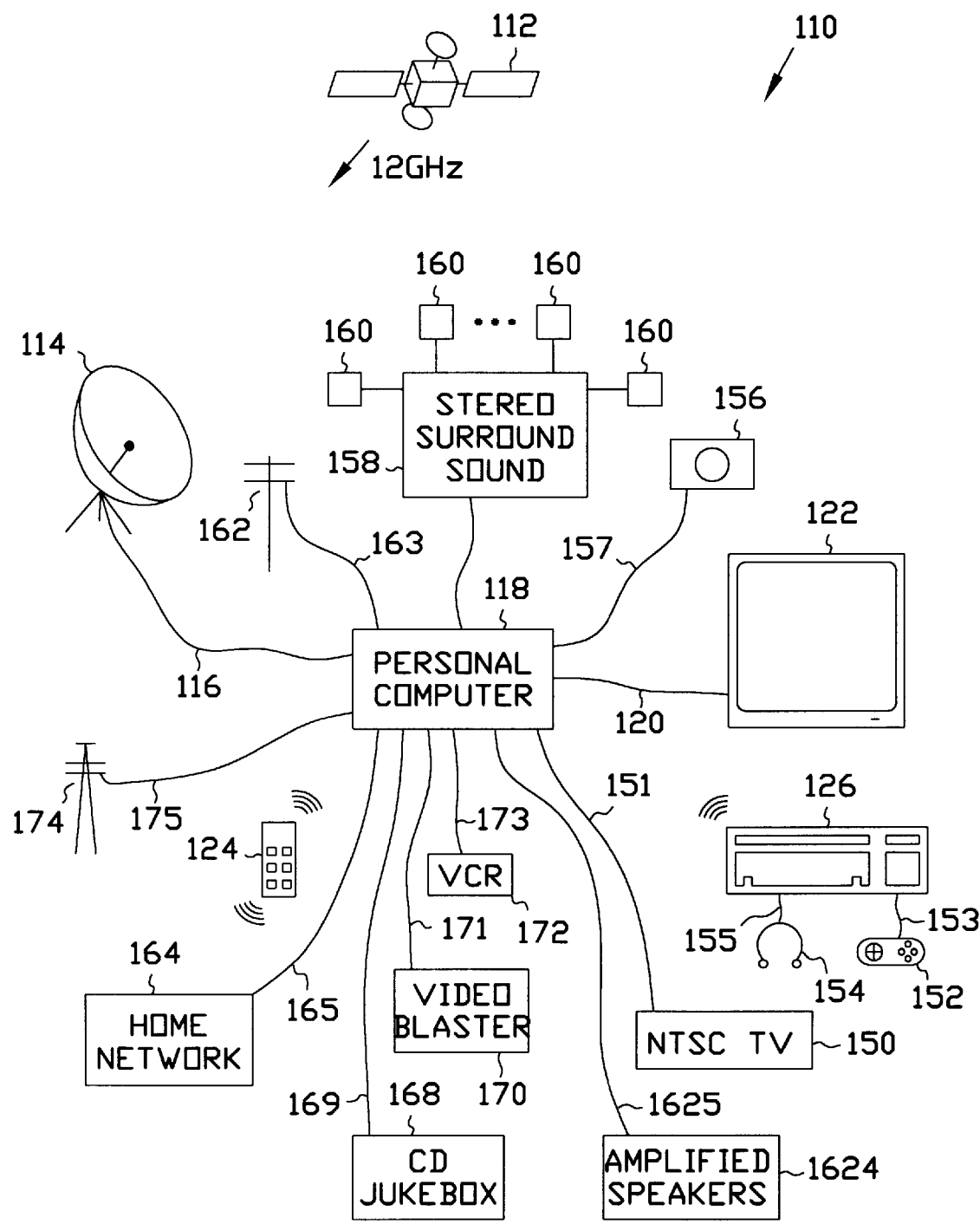
FIG. 1 is a block diagram of a home entertainment system for processing and displaying high quality video in accordance with the present invention.

In FIG. 1, a home entertainment system is shown generally at 110. The home entertainment system is described in further detail in copending application entitled HOME ENTERTAINMENT SYSTEM COMBINING COMPLEX PROCESSOR CAPABILITY WITH A HIGH QUALITY DISPLAY, Ser. No. 08/503,120, which is hereby incorporated in its entirety. Portions of the application are reproduced herein, including several of the drawings. Other relevant portions, include but are not limited to those relating to remote control and video processing.

External to the home entertainment system, a satellite 112, which in one embodiment is a HS601 model, operated by Hughes at a 101 degree west longitude geosynchronous orbital location, transmits signals comprising 150 channels of modulated digital video, audio and data signals at a frequency of about 12 GHz. The satellite signals are received by the home entertainment system 110 by an antenna 114 containing a low noise block converter amplifier. The antenna is preferably about 18 inches in diameter and receives left and right hand circularly polarized signals between 12.2 and 12.7 Ghz. The antenna provides a "downconverted-spectrum" signal between 950 and 1450 MHZ via a coaxial cable or other suitable communication medium 116 to a system device 118, such as a personal computer or other system or circuitry capable of processing data. Suitable antennas are already being manufactured and sold by RCA Corporation by direct sales and through numerous major retail chains such as Radio Shack. The system 118 contains circuitry and software to further processes the signals from the antenna, generally demodulating and decoding the signal to produce a VGA signal. The VGA signal is provided via a standard VGA compatible monitor cable 120 to drive a large screen data quality monitor 122 suitable for viewing in a family room or entertainment type room environment. The system 118 provides for user input by means of remote controls 124 and 126. Remote control 124 comprises a hand held size device with standard television controls and numeric keypad, and in one embodiment, VCR controls and a pointing device. It provides RF (radio-frequency) or IR (infrared) control signals received by the system 118. Remote control 126 is a full function personal computer keyboard, with additional standard television and VCR controls, pointing device which is preferably in the form of a touchpad, and it also provides RF control signals to the system 118. RF control signals were selected over IR or hardwired in one embodiment due to the home entertainment environment. It allows the system to be in a different room from the monitor 122, or if in the same room, a clear line of sight is not required. In another embodiment, IR control signals were selected because of the availability of many standard circuitry at low cost. Further detail of the remote control devices is provided below.

The monitor cable 120 is a standard type cable typically used on VGA display devices. The monitor 122 is preferably capable of displaying at least VGA quality data and video. At least 640 by 480 pixels of resolution are displayable on the monitor. Alternative monitors of higher quality, such as SVGA providing an even greater number of pixels are also used in a further embodiment. Many common graphics cards support multiple such formats, providing great flexibility. The tube size is 33 inches with a diagonal viewing size of 31 inches. An alternative tube size of 29 inches with 27 inch viewing area is lower cost and more suitable for an entry model entertainment system. Monitor 122 preferably contains an analog tube with an aspect ratio of 4 by 3, supports VGA input, has a dot pitch of approximately 0.8 to 0.95 millimeters for the 33 inch tube and 0.65 to 0.8 millimeters for the 29 inch tube with a misconvergence of 1 to 1.5 millimeters, a bandwidth of 15 MHz, a brightness of about 33 FL. One CRT which may be used is manufactured by Mitsubishi, having a model and type number of M79KKZ111X. The above specifications may easily be modified for larger tube sizes, but are designed to provide optimal viewability from a distance of less than two to about four meters for a combination of data and high quality video. If the viewing distance is desired to be less, the tube size and dot pitch should be decreased. If the tube size is not decreased, more pixels would need to be displayed for adequate viewing of data. SVGA monitors providing more lines would be more appropriate. Standard digital monitor controls to control brightness, contrast, vertical and horizontal sizing and positioning, on/off (rest/resume) are also provided, with both a user accessible manual control panel, and circuitry for receiving control information from personal computer 18 in via monitor cable 120. Further embodiments of monitor 22 include larger displays of 35 and 40 inches viewable and LCD large projection screen type displays. Both aspect ratios of 4:3 and 16:9, commonly referred to as wide screen are supported.

In one embodiment, full multi-media signal sourcing and destinationing of audio/video/digital-data (A/V/D) broadcasts is provided for. One embodiment of signal 116 from satellite dish 114 provides digital A/V/D signals from such sources as DirectTV or Primestar. In another such embodiment, signal 116 provides analog A/V such as NTSC antenna signals. In another such embodiment, signal 157 from camera 156 provides analog A/V such as NTSC audio/video signals. In further embodiments, signal 175 from cable source 174 provides analog and/or digital A/V/D. In further such embodiments, signal 163 from PSTN 162 provides data or phone signals such as ISDN or POTS signals. In one set of such embodiments, computer 118 is programmed to automatically record analog signals, such as television programming, onto recordable media, such as video tape, in VCR 172 coupled to cable 173. In another such set of such embodiments, computer 118 is programmed to automatically record digital signals, such as digital television programming or CD-ROM-type audio, onto recordable media, such as recordable compact disks, in CD jukebox 168 coupled to cable 169. CD jukebox 168 also plays CDS or CDROMS for use elsewhere. In another such embodiment, signals are sent to stereo-surround sound system 158 for audio output to one or more speakers 160, and on cable 151 to TV 150. In one such embodiment, earphones 154 on cable 155 and gamepad 152 on cable 153 provide additional input/output through remote control 126. Home network 164 is "smart wiring" used to transmit data and control within the home, coupled by cable 165 to computer 118. VideoBlaster 170 provides video-signal processing on cable/connector 171. Cables 175, 116, 163, 157, 151, 173, 171, 169, 155, and 153 can be wired coupling or wireless (such as RF or IR signals without wires).

Figure 2:
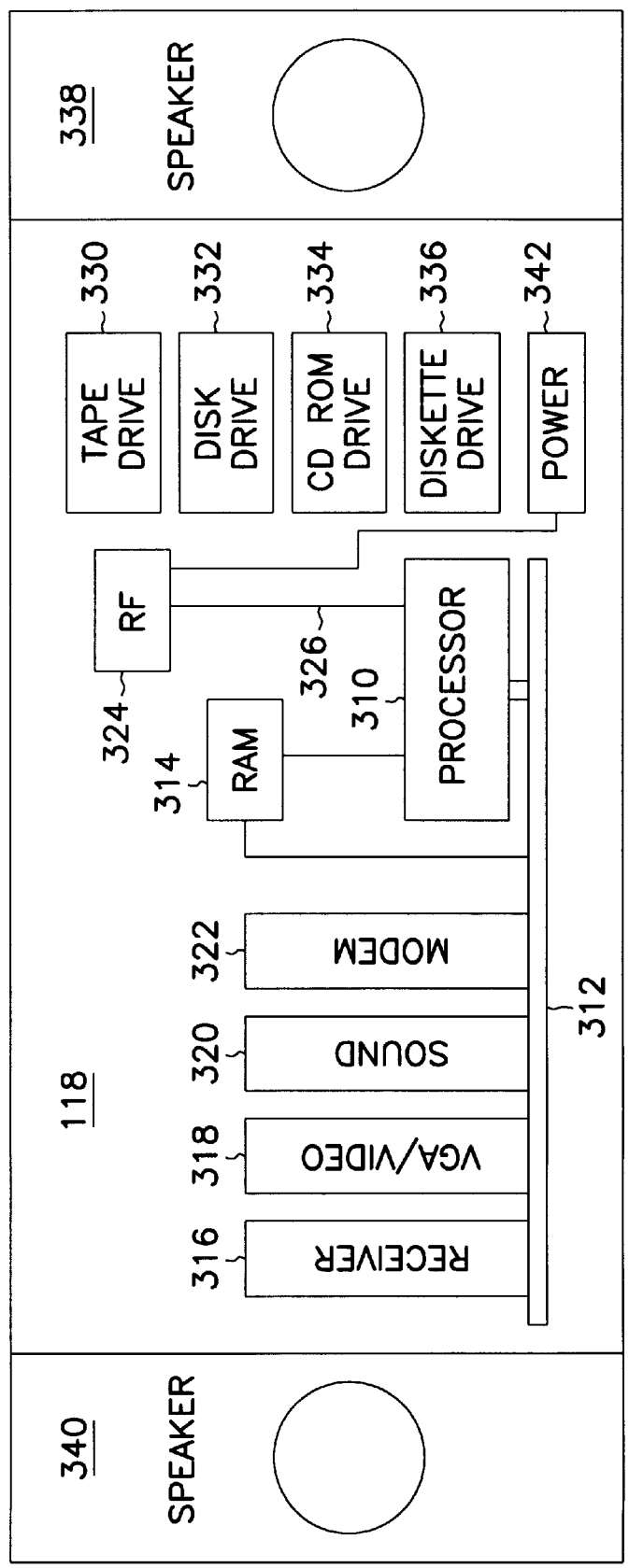
FIG. 2 is a block diagram showing major components of a personal computer in the home entertainment system of FIG. 1.

Further detail of the functional blocks of system 118 are shown in FIG. 2. A processor 310 resides on a system board containing an industry standard PCI bus 312. A random access memory 314 is coupled to both the processor 310 for direct access, and to the PCI bus 312 for direct access by other components also coupled to the PCI bus 312.

The other components comprise a receiver 316, video graphics adapter, VGA converter card 318, sound card 320 and modem 322. An RF receiver 324 is coupled to standard keyboard and mouse ports, which in turn are coupled through a standard keyboard/mouse adapter to an ISA bus 326 to processor 310. Both keyboard 126 and hand held remote 124 transmit RF signals identifying the key or combination of keys pressed, as well as a signal identifying the source of the key signal. The RF signals are typically in the megahertz range, but can also be IR or other suitable form of radiation. RF signals have the advantage over infrared "IR" signals in that they are not interrupted by someone walking between the remote and the receiver. This is especially important during a drag and drop type of activity. If the signal is interrupted for example, a needed document might be dropped on a trash can icon, causing the document to be unintentionally deleted. Light source interference and jamming of other IR receivers is minimized by using RF signals. It may also be used in a different room from the receiver.

RF receiver 324 receives the RF signals, which provide indications of the keys being pressed along with the identity of the remote control device sending the signal. RF receiver 324 comprises an ISA board or module plugged into both standard keyboard and mouse ports. The board contains RF receiver circuitry which receives the RF signals, decodes them and routes them to the appropriate port for processing. A system controller program running on processor 310 supervises software drivers which are programmed to distinguish between the sources, and control which program the remote key signals affect. If the hand held remote is activated, the key signals usually would control what channel is being displayed, or cause a recorded program to fast forward, play or reverse. It could however be selected to move to the next image in a program designed to display pictures taken on a digital camera. Keyboard keys are more likely to control a computer program application such as a word processor, spread sheet or electronic mail program. However, the television like controls might be used to override the remote hand held television controls in channel selection.

Further elements of the preferred embodiment of the present invention include a tape drive 330 for backup of data and storage of video information, such as a movie or other program, a fixed disk drive 332 for storing programs and data, a CD ROM drive 334, and a diskette drive 336, all as commonly known in the personal computer art. A pair of speakers 338 and 340 are also provided. A power supply and associated control circuitry is indicated at 342, and is coupled to the RF receiver 324 to receive signals representative of power mode commands from the remote control devices. Power circuitry 342 maintains power to the RF receiver 324 even when different parts of the system are in different power modes to ensure that the power on signal is received and executed.

In one embodiment, processor 310 is a 200 MHz Pentium processor or higher, RAM 314 comprises a minimum of 32 megabytes, disk drive 332 is a 3 gigabyte IDE hard drive, the CD ROM drive 334 is a 12x speed, and the fax/modem is a standard 33.6 k bits-per-second (or "KBAUD") modem. It should be noted that components in personal computers are getting faster, smaller and cheaper with higher capacity. It is easily anticipated that larger memories and faster modems and processors will be preferable over the next 20 plus years. In an alternative embodiment, a very high speed processor 310 is used, and receiver 316 simply comprises circuitry to transform received signals into a digital format. The remainder of the functions of the receiver 316 and VGA card 318 are performed by software routines to receive, tune multiple simultaneous channels, decompress, perform error checking and correction and convert the digital signals into digital VGA format. The VGA card 318 in this embodiment simply comprises a digital to analog converter.

In operation, when processor 310 executes a command, such as changing a channel, it sends the command over the PCI bus 312 to receiver 316, which tunes in a different channel, and the video signals are processed and sent on to VGA card 318 and sound card 320. Once on PCI bus 312, the digital MPEG signal may follow several different courses. In one embodiment, a buffer is allocated from RAM 314 to hold a user selected amount of compressed video data or information comprising computer programs. The same buffer concept may be applied to disk drive 332, which is useful for holding an even larger amount of information. Tape drive 330 is preferably an 8 millimeter tape device, and is useful for storing entire programs of data or MPEG compressed video/audio information. The tradeoffs for each storage device are clear, with the cost of storage per megabyte increasing with the speed with which it may be retrieved. Hence, while RAM provides very fast access, it is a limited resource, and does not make sense to use for much more then a few seconds of video related data. Also, it is a transitory memory in that it does not persist if power is removed. It is most useful for buffering about 10 seconds worth of video information. While it is not possible to predict how long a block of data will play when converting to video, 10 seconds is about 15 megabytes of data. The tape drive 330 is the cheapest form of data storage, but is not randomly accessible. In other words, it can take some time for the tape to move to the right place before desired data can be retrieved for playing. However, it does provide the most cost effective storage for linear playback of movies and television shows. A disk drive 332 is has an average access time of about 10 milliseconds, making it a nice tradeoff between tape and RAM for buffering portions of video information and allowing the user to select and quickly play back desired buffered video. It, like tape is also persistent.

When the MPEG data is buffered, a FIFO type of buffer is used, with new information written over the oldest information when the buffer is full. Through use of the television and VCR remote controls on hand held remote 124 and keyboard 126, VCR-like instant replay functions are provided from the buffered MPEG data. The buffered data is sent back under processor 310 control via the PCI bus 312 to the VGA card 318 for display on monitor 122.

Figure 3A:
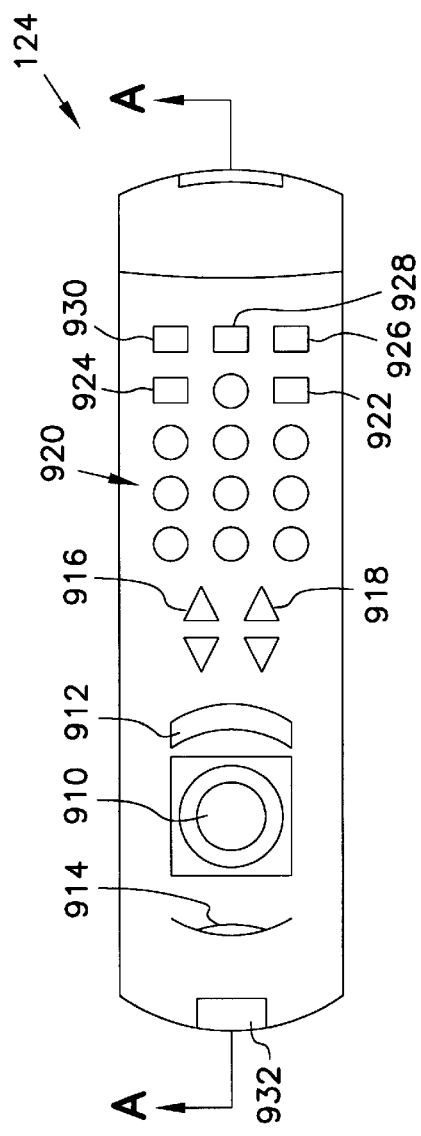
FIG. 3a is a top view of a hand held remote control device in one embodiment of the present invention.
Figure 3B:
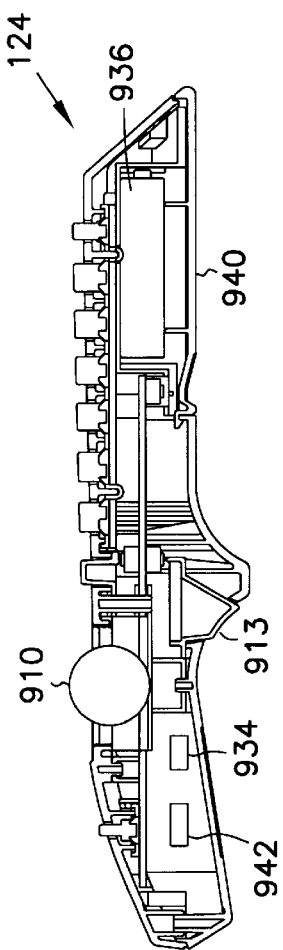
FIG. 3b is a cut away side view of a hand held remote control device in one embodiment of the present invention.
Figure 3C:
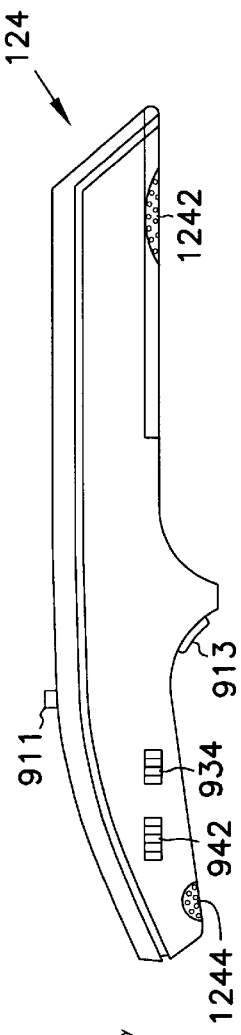
FIG. 3c is a cut away side view of an alternative hand held remote control device in one embodiment of the present invention.

Various views of the hand held remote control 124 are shown in FIGS. 3a, 3b, and 3c. A 19 millimeter optical trackball 910 is integrated into the remote, and functions just as any other pointing device for personal computers, generating cursor control signals that are transmitted to the personal computer 118. In a further preferred embodiment, the cursor control device is a miniature joystick shown at 911 in FIG. 3C, that is operated by a finger being placed on top of the stick and pushing in the direction of desired cursor movement. Selection buttons, or mouse clickers are provided at 912 for the user to press to select functions on the personal computer that the cursor is touching. An additional trigger like selection button is provided at 913, which is convenient for use by an index finger if holding and pointing the remote in a natural position. It is also useful as a pseudo trigger for many games, and for one handed dragging and dropping of icons.

Figure 4:
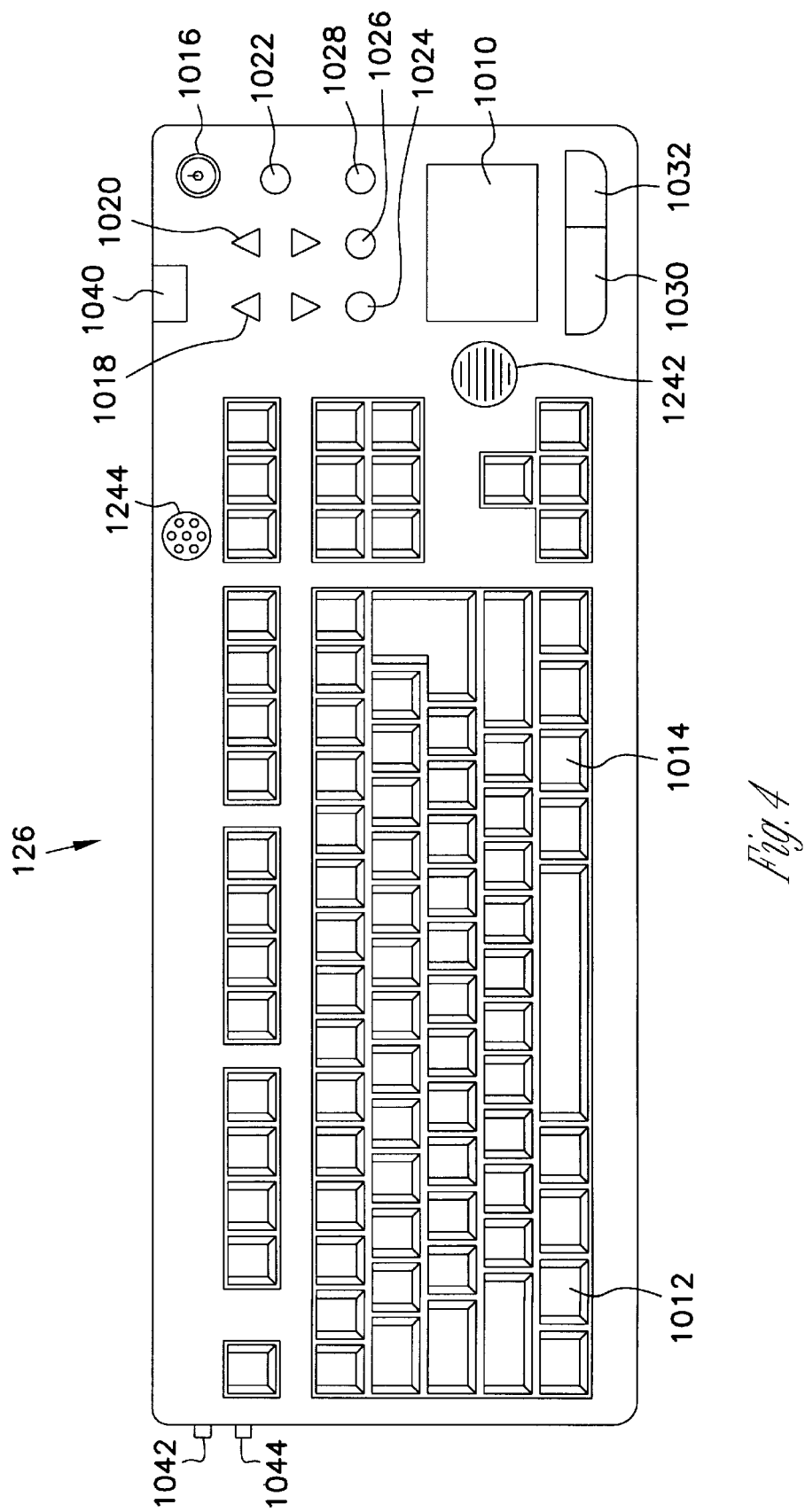
FIG. 4 is a top view of a keyboard remote control device in one embodiment of the present invention.

In one embodiment, as shown in FIG. 3C, a microphone 1244, an earphone 1242, and an RF transceiver are included in remote control devices 124, providing a cordless-telephone functionality, with PC 118 being the base unit and remote control 124 being the remote unit. In another such embodiment, as shown in FIG. 4, a microphone 1244, a speaker 1242, and an RF transceiver are included in remote control device 126, providing a cordless-telephone functionality, with PC 118 being the base unit and remote control 126 being the remote unit. Phone calls can be received or initiated by activating a "phone" function by pressing one or more of the control buttons on the phone, such as simultaneously pressing buttons 922 and 928, which, in one embodiment, toggles function between TV and phone, thereby automatically muting the audio of the TV when phone function is desired.

A power switch is provided at 914 to provide power mode selection functions for the monitor 122 and other selected portions of personal computer 118. Channel control buttons 916 provide the familiar television/VCR up and down channel control functions. Volume controls 918 are also provided, as is the standard number keypad in television remote controls indicated generally at 920. Further provided are mute button 922, channel recall 924, FAV (favorite channel or menu) button 926 and TV button 928, which serves to cycle the display through full screen display of a television program, to putting it in a window, to hiding it completely. An additional function set control button 930 is used to select functions provided by an operating system beyond those normally provided today. Much as the "Ctrl" and "Alt" keys are used to select different functions, the function set button 930 is similarly used on the hand held remote 124 to select the functions defined by the operating system. FAV button 926 may be unique to each family member, and comprise a listing of the users favorite television programs, games, computer application programs, home pages on internet, or other interfaces into the electronic world.

Hand held remote 124 also contains RF generating circuitry coupled to all the keys and pointing devices for generating RF signals corresponding to the buttons pressed for reception by RF circuitry 324. The power of the RF signal is adjustable via a thumbwheel indicated at 934, which is coupled to further power adjusting circuitry. Power is provided by a standard 9 volt cell 936, or multiple double "A" batteries, accessible via a removable panel 940.

Remote keyboard 126, shown in further detail in FIG. 4, is very similar to a MF II keyboard, except that the numeric key pad has been replaced with television/VCR like remote control buttons, and a touchpad indicated at 1010. In addition, it contains a pair of function set keys 1012 and 1014 for invoking the same functions as button 930 on hand held remote 124. The television/VCR buttons include a power button 1016, volume controls 1018, channel controls 1020, TV/CR button 1022, mute button 1024, a favorite channel/function button 1026 and a channel recall button 1028. In addition, selection keys 1030 and 1032 are provided to select function indicated by the cursor as controlled by touchpad 1010. Touchpad 1010 is integrated into the remote keyboard, and permits easy manipulation of the cursor by simply moving an object, such as a pen, stick or finger/finger nail across the pad in the desired direction. It can be useful for performing signatures to validate transactions, or restrict access to files. By integrating touchpad 1010 directly in the remote keyboard 126, there are no external connections, or sliding drawers to contend with, which could easily become clogged with grease, butter, sugar or any of the other messy things people eat while being entertained in a family entertainment center. The portion of the keyboard containing the television/VCR remote controls is preferably sealed, and impervious to being affected by such foods and drinks as are commonly found in a family room. Since the keyboard is more likely to be heavily used, a higher number of double "A" batteries are used. Four to eight provide a suitable length of operation. They may be rechargeable, and an external powerjack 1042 is provided to allow the keyboard to be plugged into standard electrical utility power supplies.

As with the hand held remote 124, the keyboard remote 126 comprises RF generating circuitry 1040 to provide RF signals for reception by RF circuitry 324 in personal computer 118. RF circuitry 1040 also adds on a keyboard identifier with the signals it transmits, which identifies each keystroke as originating from the keyboard. In one embodiment, it is a set of bits that is unique to the remote device. This helps prevent inadvertent interference from other owners of similar home entertainment systems from inadvertently controlling the users system. In another embodiment, the frequency is shifted slightly from that emitted by the hand held remote, and RF circuitry 324 detects the bits, or the frequency shift and identifies the keystrokes as originating from either the hand held remote, or the remote keyboard which is associated with the system. In yet a further preferred embodiment, multiple remotes are provided, each with its own identifying frequency or code, including joysticks for controlling games. In this manner, each individual in the room can be controlling their application or program in a window, or be playing different parts in a game. Since all remotes would be sending the same signals to represent the same functions, the drivers for such remotes running on processor 310 need not differ. They need only be designed to handle multiple different sources of the keystrokes, button strokes, mouse, stick or touchpad signals.

Pressing of either of the power buttons 914 or 1016 or a combination of keys comprising WIN+ALT+ PRINTSCREEN causes transmission of a POWER KEY signal to the RF receiver 324. The POWER KEY signal is then provided to a keyboard driver and then to an applet as a WM_HOTKEY message of 0x000. The applet is executing on processor 310 out of RAM 314. A flowchart describing the operation of the keyboard driver and applet is shown generally at 510 in FIG. 5. Note that either the hand held remote or keyboard can provide the POWER KEY signal at 512 and 514. The keyboard driver indicated at 516 receives the signal and provides it to the Windows operating environment at 517, which sends the WM_HOTKEY message 518 to the applet at 520. The Applet 520 first checks to see what state the system is in, and also verifies that the power key was not just held down. A timer is set when the first POWER KEY message is received and runs for 3 seconds. Any subsequent POWER KEY messages are ignored until following the 3 seconds. If the power is on, the applet generates a send driver message and provides it to the driver for the video card/controller 318 at 522 to set the monitor to standby power mode. This essentially shuts off the monitor and greatly reduces power consumption. The applet also generates a toggle MUTE OFF/ON command and sends it to the audio subsystem or sound card 320 at 524 to turn off the volume. Thus, a user perceives that audio and video functions have been turned off.

If the power is off, the applet generates a send driver message and provides it to the video driver at 522 to set the monitor to on, thus turning on the monitor very quickly, because no programs need to be reloaded. Since the processor was always running, no code was unloaded. The applet also generates a toggle MUTE OFF command and sends to the audio subsystem. These commands are Windows Advanced Power Management (APM) commands that many sound and video controllers can accept and execute. By providing such commands in an applet, the speed at which such commands are provided to the audio and video cards is increased to more closely emulate the speed at which televisions are normally turned on and off.

Figure 5:
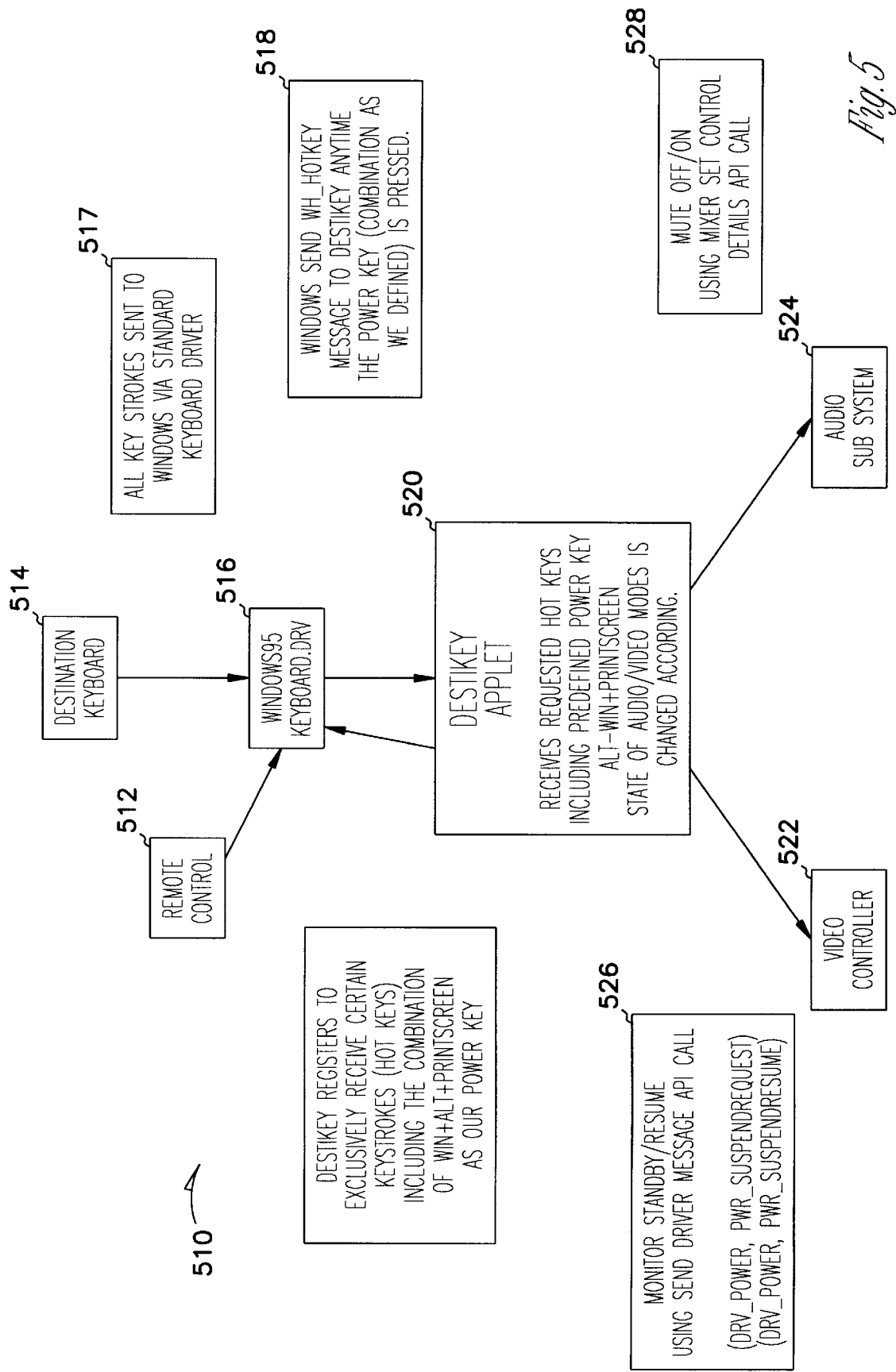
FIG. 5 is a block flow diagram of an improved power manager of the home entertainment system of FIG. 1.

The applet also talks directly to video drivers for the video card and emulates a standard APM call. This tricks the video driver into thinking the whole system is in a normal sleep mode. The monitor no longer receives vertical and horizontal sync, and hence it is in standby mode. The processor continues to operate, allowing auto downloading of program guides, system maintenance and other tasks not requiring user intervention. The commands are shown in FIG. 5 in the boxes labeled 526 and 528.

It is to be understood that the above description is intended to be illustrative, and not restrictive. Many other embodiments will be apparent to those of skill in the art upon reviewing the above description. The selected devices can also comprise devices other than those processing sound and audio, such as modems and secondary storage devices such as tape drives, disk drives and CD drives which need not be operating if a user is not interacting with the computer system. It results in a further reduction in power consumed. The embodiments have been described as being written in computer programming code. It is clear to those skilled in the art that the invention may take many forms, including firmware and hardware as well as many different programming languages. A printout of the source code for the applet follows beginning on the next page.

```
case WM_HOTKEY:
{
switch (wParam}
    {
        case 0x0010:            // Power Button has been pressed.
            if(bPowerTime)      // debounce key
                return 0;       // So ignore this extra message
            else
            {
                bPowerTime = TRUE;      // Set debounce timer 3 secs
                uTimer2 = SetTimer(hwnd, 2, 3000, NULL);
            }
            // Next let's check if the power is coming on or off
            if(bPowerOn)            // Power is on here
            {                       // Set power state to OFF
                if(ToggleMonitor(TRUE))    // Set monitor to Standby
                {// If everything goes ok, continue other sleep stuff
                    ToggleMute(MUTE_ON); // Mute the volume
                    bPowerOn = FALSE;
                    UpdateBars(0);
                    iTimeOut = 0;
                    iBarTimer = 0;
                }
            }
            else // if not Power Mode
            {                              // Set Power State to ON
                if(ToggleMonitor(FALSE))   // Turn on Monitor
                {   // If monitor comes on then we're back
                    ToggleMute(MUTE_OFF);   // Turn on Audio
                    bPowerOn = TRUE;
                    bPowerTime = FALSE;
                    bPowerOn = TRUE;
                    UpdateBars(0);
                    iBarTimer = 0;
                    return TRUE;
                }
            }
        return FALSE;
}
//    This function talks directly to our video device and emulates
//    a standard APM
//    call. This tricks the monitor into thinking the whole system
//    is in a normal sleep mode.
LRESULT ToggleMonitor(BOOL bStandby)
{
    LRESULT lResult;
    HDRVR   hDriver;
    hDriver = OpenDriver((LPCWSTR)"BTVAPM.DRV",(LPCWSTR)"",
OL);
    if(hDriver)
    {
        if(bStandby)
        {
            lResult = SendDriverMessage(hDriver, DRV_POWER,
        PWR_SUSPENDREQUEST, OL);
        }
        else
        {
```

-continued

```
            lResult = SendDriverMessage(hDriver, DRV_POWER,
        PWR_SUSPENDRESUME, OL);
        }
        CloseDriver(hDriver,OL,OL);
        return lResult;
    }
    else
        MessageBox(NULL, (LPSTR)"Missing Power Management
        file.", (LPSTR)szApp, MB_OK | MB_ICONERROR);
return OL;
}
//   This function allows the program to set the Mute On, Off or just
//   toggle the current state.
//   This routine uses Windows functions found in mmsystem.h
BOOL ToggleMute(int iState)
{
MIXERCONTROLDETAILS mxcd;
DWORD dwDetails[2];
MMRESULTmm;
    if(!hMixerID)
        hMixerID = GetMixers();    // Handle to Windows Audio
    if(!hMixerID) return FALSE;
    mxcd.cbStruct = sizeof(mxcd);
    mxcd.dwControlID =    LineIn[iCurrentLine].dwMuteID;
    mxcd.cMultipleItems =   0;
    mxcd.cbDetails = sizeof(*dwDetails);
    mxcd.paDetails = dwDetails;
    mxcd.cChannels =        1;
    //   Get current Mute state from system
    //   Current state will be placed in dwDetails[0]
    mm = mixerGetControlDetails(hMixerID, &mxcd,
        MIXER_GETCONTROLDETAILSF_VALUE |
        MIXER_OBJECTF_MIXER);
    dwDetails[1]= 0; // clear of any garbage
    switch (iState)
    {
        case MUTE_OFF: // MUTE_OFF = 0
            dwDetails[0] = 0;
            break;
        case MUTE_ON:           // MUTE_ON = 1
            dwDetails[0] = 1;
            break;
        case MUTE_TOGGLE:       // MUTE_TOGGLE = 2
            if(dwDetails[0])
                dwDetails[0] = 0;
            else
                dwDetails[0] = 1;
            break;
        default:                // just update screen
            break;
    }
    //   Set the Mute state based on the value of dwDetails[0]
    mm = mixerSetControlDetails(hMixerID, &mxcd,
        MIXER_GETCONTROLDETAILSF_VALUE |
        MIXER_OBJECTF_MIXER);
    if(dwDetails[0] == 0)
    {
        if(uTimer3 == 0)  //    Mute coming off
        {           //     Put current volume bars up for 3 seconds
            iBarTimer = 3;
            uTimer3 = SetTimer(hwndMain, 3, 1000, NULL);
            UpdateControl((HWND)NULL, iCurrentLine);
        }
    }
    else
    {   // Mute coming On
        // Put up Mute Indicator and leave it on
        iBarTimer = 1000;
        UpdateBars(1);
    }
    //   return current Mute state
    return (BOOL)dwDetails[0];
}
```

What is claimed is:

1. An entertainment system comprising:
   a computer system having multiple power modes;
   a receiver coupled to the computer;
   a remote control having a power selector and a transmitter that transmits power key signals to the receiver in response to actuation of the power selector; and
   an applet running on the computer that issues power mode commands to display functions in the computer in response to the power key signals.

2. The entertainment system of claim 1 wherein the receiver and transmitter operate in the RF frequency range.

3. The entertainment system of claim 1 wherein power selector is a power button on the remote control.

4. The entertainment system of claim 1 wherein the power mode commands comprise on and standby.

5. An entertainment system comprising:
   a computer having multiple power modes and having audio and video controller circuitry and corresponding drivers;
   a receiver coupled to the computer;
   a remote control having a power selector and a transmitter that transmits power key signals to the receiver in response to actuation of the power selector; and
   an applet running on the computer that issues power mode commands to the audio and video drivers to toggle the audio between on and mute and to toggle a display coupled to the video controller circuitry between two power modes in response to the receiver receiving a power key signal.

6. The entertainment system of claim 5 wherein the power commands are executed by the video driver independently of system power commands.

7. The entertainment system of claim 5 wherein the power modes comprise on and standby.

8. The entertainment system of claim 5 wherein the receiver and transmitter operate in the RF frequency range.

9. The entertainment system of claim 5 wherein the power selector comprises a power button on one of a hand held remote device and a remote keyboard.

10. An entertainment system comprising:
    a computer system having multiple power modes and having audio and video controller circuitry and corresponding drivers that drive audio and display functions;
    a receiver coupled to the computer that receives signals;
    a remote control user input device having a power selector and a transmitter that transmits a power key signal to the receiver in response to user selection of the power selector; and
    an applet running on the computer that issues power commands to the audio and video controller circuitry to toggle audio and video display functions between two power modes in response to the receiver receiving a power key signal.

11. The entertainment system of claim 10 wherein the power commands are executed by the video driver independently of system power commands.

12. The entertainment system of claim 10 wherein the power modes comprise on and standby.

13. The entertainment system of claim 10 wherein the receiver and transmitter operate in the RF frequency range.

14. The entertainment system of claim 10 wherein the power selector comprises a power button on one of a hand held remote device and a remote keyboard.

15. A storage medium having a computer program stored thereon for causing a suitably configured computer system to perform the steps comprising:
    identifying a received power key signal from a remote user input device as a power key command;
    checking to determine the current power state of a video controller and an audio controller which are used to process television based video and audio signals; and
    issuing commands to toggle the video controller and the audio controller between at least two different power modes such that a user perceives the video and audio signals in the same manner as instant on functionality of a television set.

16. An entertainment system comprising:
    a computer having audio and video controller circuitry;
    a receiver coupled to the computer that receives signals;
    a remote control user input device having a power selector and a transmitter that transmits a power key signal to the receiver in response to user selection of the power selector;
    a keyboard driver running on the computer and coupled to the receiver for generating an on/off hotkey message;
    a video driver and an audio driver running on the computer;
    an applet running on the computer that issues power commands to the audio and video drivers to toggle between two power modes in response to the on/off hotkey message.

17. The entertainment system of claim 16 wherein the power commands are executed by the video driver independently of system power commands.

18. The entertainment system of claim 16 wherein the power modes comprise on and standby.

19. The entertainment system of claim 16 wherein the receiver and transmitter operate in the RF frequency range.

20. The entertainment system of claim 16 wherein the power selector comprises a power button on one of a hand held remote device and a remote keyboard.

* * * * *